Patented Sept. 26, 1939

2,174,158

UNITED STATES PATENT OFFICE 2,174,158

PHOSPHORIC ACID PURIFICATION

Raymond J. Kepfer, Lakewood, and William R. Devor, East Cleveland, Ohio, assignors to E. I. du Pont de Nemours & Company, Wilmington, Del., a corporation of Delaware No Drawing. Application November 11, 1937, Serial No. 174,057

1 Claim. (Cl. 23—107)

This invention relates to the manufacture of phosphoric acid and alkali metal phosphates with particular reference to the removal of lead and arsenic impurities, and is directed to that improvement in sulfide precipitation processes which comprises neutralizing at least eight per cent of the phosphoric acid with an alkali metal base and then precipitating lead and arsenic as sulfides.

Technical phosphoric acid such as that obtained by the decomposition of phosphate rock with sulfuric acid contains numerous impurities such as arsenic, lead, iron, aluminum, fluorine, and silicon. The procedures for removing these impurities differ considerably with different manufacturers. In general, however, lead and arsenic are removed by precipitation as sulfides and iron, aluminum, fluorine, and silicon by the addition of suitable alkali or alkaline earth metal compounds.

In the sulfide precipitation processes commonly employed a soluble sulfide such as hydrogen sulfide or barium sulfide is added to the decomposition liquor prior to the separation of the calcium sulfate. It has also been proposed to precipitate the arsenic and lead in the filtered or technical acid in much the same manner.

The phosphoric acid is then treated with an alkali for the removal of iron, aluminum, fluorine, and silicon. When the fluorine is present as fluosilicic acid a fluosilicate is precipitated, and when present as hydrofluoric acid an alkali or alkaline earth metal fluoride is precipitated. After removal of this precipitate further alkali is added whereupon iron and aluminum precipitate as phosphates.

When it is desired to produce alkali metal phosphates iron, aluminum, fluorine, and silicon may be removed during the neutralization of the phosphoric acid with a suitable alkali metal base. This neutralization of the phosphoric acid may be considered as proceeding in three steps—primary, secondary, and tertiary orthophosphates being formed successively. If the tertiary phosphate is considered as representing a hundred per cent neutralization of the phosphoric acid, the secondary and primary phosphates will correspond respectively to 66.7 per cent and 33.3 per cent neutralization. Successive stages of neutralization may accordingly be represented in per cent.

When the neutralization reaches about eight per cent, that is, when about one-fourth of the phosphoric acid is neutralized to the primary stage, the fluorine and silicon present as fluosilicic acid are precipitated as an alkali metal fluosilicate which may be recovered by filtering or decanting in a known manner. The addition of the alkali metal base is then continued until iron and aluminum are precipitated as complex phosphates which may be recovered in the same manner as alkali metal fluosilicates. For this purpose the neutralization is continued to about 70 per cent, that is, to or slightly beyond the secondary stage. If the tertiary phosphate is the product desired, the addition of alkali metal base is then continued until a hundred per cent neutralization has been effected, whereas if phosphoric acid is desired sulfuric acid in the required amount is added. Sulfates may be precipitated as barium sulfate in the usual manner.

Phosphoric acid and alkali metal phosphates in a relatively pure form may be obtained in the manner described above but the amount of arsenic and lead in these products is too high for many purposes, frequently amounting to several parts per million.

We have now found that the arsenic and lead content may be reduced materially by the processes of this invention wherein the sulfide precipitation is effected after at least eight per cent but before 63 per cent neutralization has been reached. Under these conditions, if sufficient time is allowed for the pecipitated sulfides to settle, we are able to obtain effective reduction of lead and arsenic to less than one part per million.

The conditions governing precipitation of lead and arsenic sulfides differ considerably. For example, we have found that with increasing degree of neutralization lead sulfide becomes increasingly insoluble, whereas with the neutralization above about 63 per cent arsenic sulfide is incompletely removed. Thus we have found that if the sulfide precipitation is effected within the neutralization range of from about eight per cent to about 63 per cent both the lead and the arsenic may be effectively removed. With more acidic solutions the arsenic removal is inconsistent and the lead removal is incomplete, whereas in more alkaline solutions the removal of arsenic is incomplete.

Of course, both lead and arsenic may be precipitated as sulfides in more acidic or more alkaline solutions but not to the degree required for certain commercial uses. Thus with more acidic solutions it is difficult to obtain products having a lead content less than 1 part per million. Likewise, it is difficult consistently to obtain the removal of arsenic to such a low value under the same conditions. With more alkaline solutions lead may be removed effectively, but too much arsenic remains in solution.

We prefer to effect the sulfide precipitation after the removal of the alkali metal fluosilicate in order to prevent contamination of this valuable by-product with the sulfides. We may effect the sulfide precipitation before the iron and aluminum precipitation for the same reason. However, as the iron and aluminum phosphates are valuable mainly as fertilizers, small amounts of lead and arsenic sulfides may be unobjectionable. Thus it is expedient to effect the sulfide precipitation concurrently with the iron and aluminum precipitation. This may be done effectively at the primary stage, that is, at a neutralization of about 33⅓ per cent. Moreover, exceptionally effective removal of lead and arsenic may be obtained at this stage.

The alkali metal bases useful in the processes of this invention are well known. Thus tertiary and secondary alkali metal phosphates, alkali metal carbonates, hydroxides, and the like or any mixture of these basic materials may be employed.

The sulfides useful for precipitating lead and arsenic are likewise well known. We prefer, however, to employ the sulfides whose presence in the product is not deleterious and which are sufficiently soluble at the neutralization stage specified. A twenty per cent solution of sodium sulfide has been found eminently satisfactory. Preferably the sulfide solution is introduced below the surface of the liquor being treated, if acid, in order that the hydrogen sulfide evolved may be used most effectively. Hydrogen sulfide itself may also be employed effectively and has the advantage that the excess may be removed by blowing air thru the liquor.

Other factors affecting the completeness of the sulfide precipitation are the temperature at which the precipitation is effected and the time allowed for the precipitate to settle. Thus we have found it desirable to effect a precipitation at a temperature of at least 120° F. and to allow the precipitate to settle for a period of several hours. The latter is particularly important as effective removal of both lead and arsenic to below one part per million can only be obtained by a settling period of several hours. For example, with crude phosphoric acid containing from about 11 to 13 parts per million of arsenic and 1 to 5 parts per million of lead, a settling period of from about 15 to about 24 hours is generally required to effect a removal of these impurities to less than 1 part per million in the product.

While we have disclosed specifically 15 to 24 hours as a representative time for allowing the sulfide precipitate to settle, it is to be understood that considerable variation is possible in this respect, depending upon the particular conditions obtaining. Thus the amount of impurities, the temperature, the degree of neutralization, and the presence of other precipitates such as iron and aluminum phosphates, will affect the rate of settling. It is also possible to accelerate the rate of precipitation by mechanical means well known for this purpose. Hence the settling period may be considered as an inverse function of the settling rate and may be proportionately decreased as the rate of settling is increased either by chemical or mechanical means. Reference herein to a settling period of several hours or in the order of 15 to 25 hours is consequently to be interpreted in the light of the foregoing as illustrative of the quantitative settling effect and not as an inflexible delineation of time independent of the particular condition obtaining.

We claim:

In the manufacture of secondary and tertiary sodium orthophosphates by neutralization of crude phosphoric acid with a sodium base the method of removing lead and arsenic impurities whereby secondary and tertiary sodium orthophosphates containing less than one part per million each of lead and arsenic can be obtained which comprises precipitating the lead and arsenic as sulfides by adding sodium sulfide after at least 8 per cent and before 63 per cent neutralization, precipitating the lead and arsenic sulfide from the phosphate solution before further neutralization and after a settling period in the order of about 15 to about 24 hours, and thereafter further neutralizing to at least the disodium phosphate stage and recovering solid sodium phosphate.

RAYMOND J. KEPFER.
WILLIAM R. DEVOR.